United States Patent [19]
Colletti

[11] Patent Number: 5,396,793
[45] Date of Patent: Mar. 14, 1995

[54] ALTITUDE GAS TURBINE ENGINE TEST CELL

[75] Inventor: William D. Colletti, Cromwell, Conn.

[73] Assignee: United Technologies Corporation, Hartford, Conn.

[21] Appl. No.: 123,010

[22] Filed: Sep. 17, 1993

[51] Int. Cl.$^6$ ............................................. G01M 15/00
[52] U.S. Cl. ................................. 73/117.4; 73/865.6
[58] Field of Search .................. 73/117.1, 117.4, 865.6

[56] References Cited

U.S. PATENT DOCUMENTS

| | | | |
|---|---|---|---|
| 2,615,331 | 10/1952 | Lundgren | 73/117.1 |
| 3,205,705 | 9/1965 | Talley | 73/117.4 |
| 4,034,604 | 7/1977 | Decher et al. | 73/117.4 |
| 4,537,068 | 8/1985 | Simpson | 73/117.4 |

FOREIGN PATENT DOCUMENTS 4326280  7/1964  Japan ............................... 73/117.1

Primary Examiner—Richard E. Chilcot, Jr.
Assistant Examiner—Eric S. McCall
Attorney, Agent, or Firm—Edward L. Kochey, Jr.

[57] ABSTRACT

The test cell has a pressure recovery pipe (26) receiving air from the tested engine (14). Excess air is inherently induced into the pipe. A source flow path for this excess air is provided from within the pipe (36) back to the entrance the pipe passing through a perforated bulkhead (30). High local velocities of the recirculating air, resulting variable static pressures on the engine and uncertainty in the thrust measurement are avoided.

4 Claims, 2 Drawing Sheets

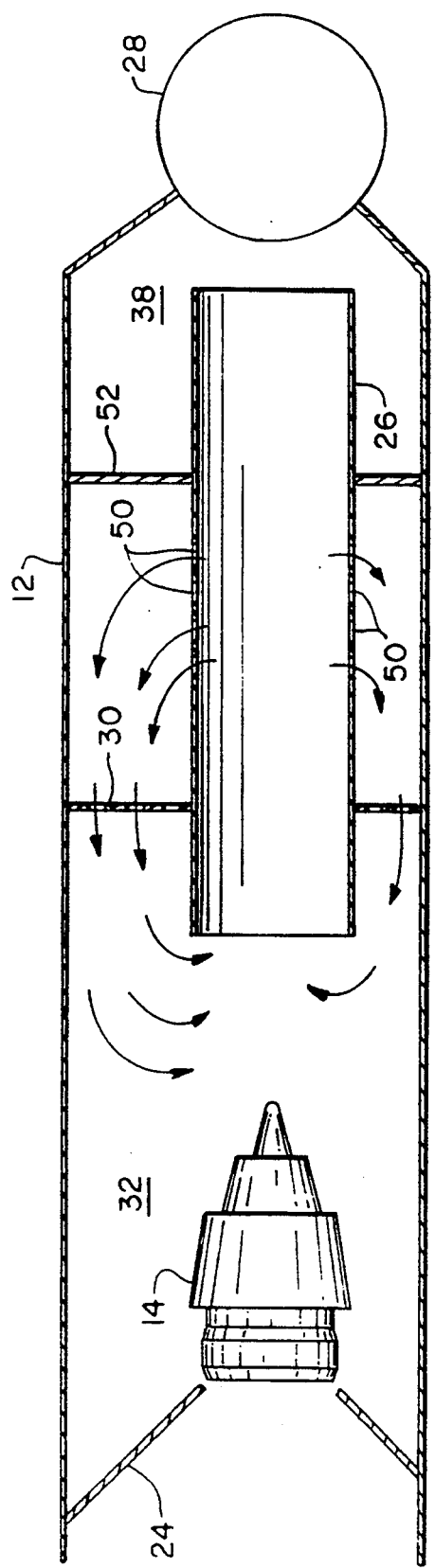

ALTITUDE GAS TURBINE ENGINE TEST CELL

TECHNICAL FIELD

The invention relates to test cells for thrust testing of gas turbine engines, and in particular to cells for testing at simulated altitudes.

BACKGROUND OF THE INVENTION

Gas turbine engines for aircraft are normally guaranteed for thrust performance. A newly manufactured engine must be tested to determine compliance with the guarantee. Precise measurement is required. Thrust testing is also required during engine development.

For sea level operation the testing may be performed outdoors. It is preferable however to use an indoor test cell which offers several advantages in performing the test. The test is less affected by variable wind and unreliable weather conditions. Noise also can be attenuated to avoid excessive disturbances.

With indoor testing for sea level performance, the engine is supported in a duct. The exhaust flow induces some engine bypass flow.

Where altitude testing is required it is necessary to operate an exhaust compressor to reduce the pressure within the test cell. Engine bypass air is not desirable since this excess air must now be pumped with an exhaust compressor. Accordingly inlet air guides are used to direct all of the inlet flow through the engine.

Discharge of the gas turbine engine exhaust into a pressure recovery pipe reduces the head against which the exhaust compressors must operate. It is conventional therefore to use this discharge pressure recovery pipe with a bulkhead between the pipe and the walls of the duct.

As the gas turbine engine discharge passes into this pressure recovery pipe some of the cell air is drawn into the pipe. Since there is no supply of air to the chamber, the air regurgitates out of the pipe, resulting in high velocity flows into the chamber. These high velocities are in the order of 30% of the engine jet velocity.

Pressure rise results as the high velocity is reduced. This results in an axially variable static pressure acting against the external surface of the engine. An axial thrust force is imposed against the engine resulting in a test measurement uncertainty of about 1%.

It is an object of the invention to reduce the velocity of the reverse flow external of the engine, whereby variations in static loading are reduced.

SUMMARY OF THE INVENTION

The test cell includes an airflow pipe or duct having a plurality of walls and means for supporting a gas turbine engine within the duct. An air inlet guide funnel is located for guiding substantially all of the inlet air into the supported gas turbine engine, while a pressure recovery pipe is substantially coaxial with the downstream of the gas turbine engine. An exhaust compressor is located to draw air from this pressure recovery pipe.

A perforated bulkhead extends between the pressure recovery pipe and the surrounding walls of the airflow duct. This divides the airflow duct into a low pressure chamber in direct communication with the inlet of the pressure recovery pipe, and a high pressure chamber in fluid communication with the interior of the pressure recovery pipe.

The total flow area of the perforations of the perforated bulkhead is between 10% and 50% of the flow area of the duct around the pressure recovery pipe. This duct area equals the total area of the perforate bulkhead.

The high pressure chamber may be in fluid communication with the interior of the pipe in one of two ways. The pressure recovery pipe may be supplied with holes in the pipe wall opening into the high pressure chamber. The pipe exits into a compressor suction cavity which is separated from the high pressure cavity with a solid bulkhead. Alternately a compressor suction cavity located between the pressure recovery pipe and the exhaust compressor may be arranged to be contiguous with and open to the high pressure chamber.

BRIEF DESCRIPTION OF THE DRAWINGS

FIG. 3 is a side section through a test cell with an alternate configuration having also a solid bulkhead between the pressure recovery pipe and the wall of the duct.

DESCRIPTION OF THE PREFERRED EMBODIMENT

Figure 1:
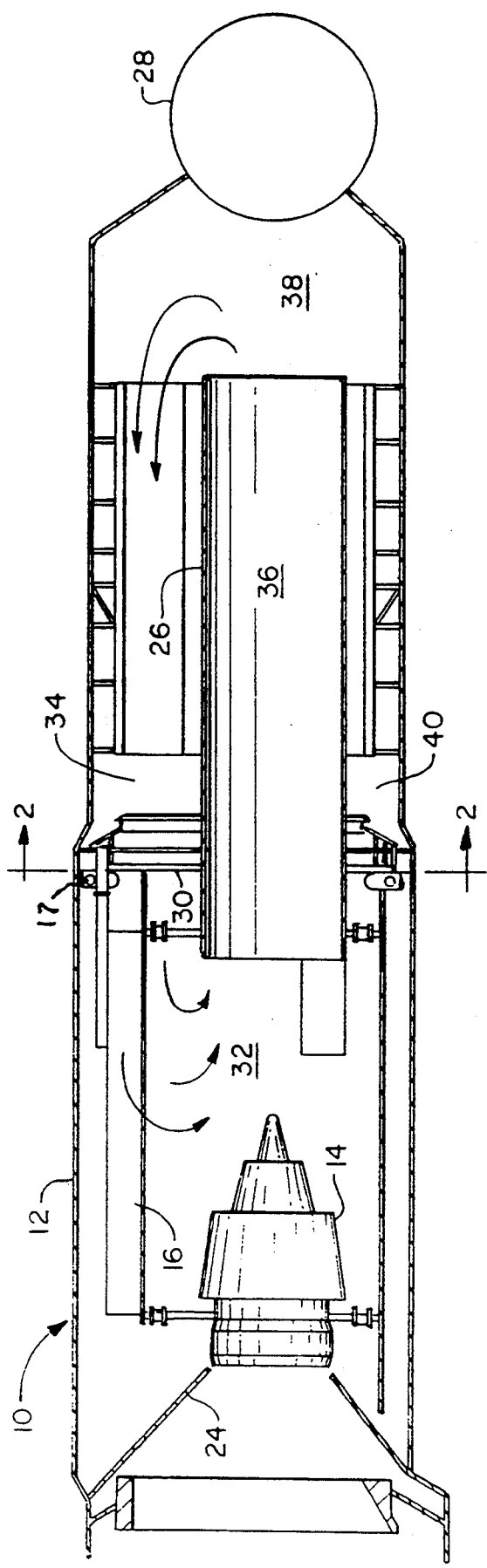
FIG. 1 is a side section through the test cell.

Referring to FIG. 1 an airflow duct 10 is defined by a pipe 12 or a plurality of walls. A gas turbine engine 14 is supported within the air duct on supports 16 adapted for thrust measurement by load cell 17 when the engine is operating.

An air inlet guide funnel 24 is located for guiding substantially all of the inlet air into the gas turbine engine. Very little air therefore bypasses the compressor minimizing the load on the exhaust compressor to be described hereinafter.

A pressure recovery pipe 26 is located coaxial with and downstream of the gas turbine engine 14. An exhaust compressor 28 is located to draw air from this pressure recovery pipe.

A perforated bulkhead 30 is sealingly located between the pressure recovery pipe and the wall of the airflow duct. This divides the airflow duct into a low pressure chamber 32 into which the gas turbine engine discharges and which is in direct communication with the inlet of the pressure recovery pipe 26. It divides it also into a high pressure chamber 34 in fluid communication with the interior 36 of the pressure recovery pipe 26.

A compressor suction cavity 38 is located upstream of the exhaust compressor with the pressure recovery pipe 26 arranged to discharge flow into the compressor suction cavity. The high pressure chamber 34 is open to and contiguous with this compressor suction cavity 38.

Figure 2:
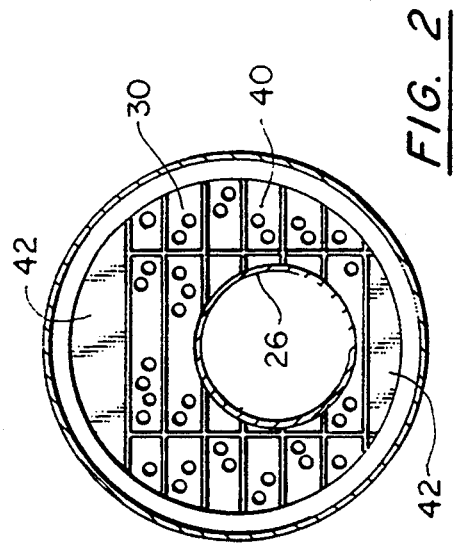
FIG. 2 is a section taken along line 2—2 of FIG. 1.

FIG. 2 is taken along section 2—2 of FIG. 1 illustrating the perforated bulkhead 30 with an open flow area between 10% and 50% of the total annular flow area 40 of the pressure recovery pipe 26 solid plates 42 block a portion of the flow area.

The perforations in the plate 30 are spread throughout the plate in order to avoid a high velocity at any location. The total recirculating flow through this bulkhead is on the order of 30% of the gas turbine engine flow. To avoid a large pressure difference between the high pressure chamber 34 and low pressure chamber 32 a pipe must be chosen to avoid a large pressure rise or an orifice must be used at the pipe exit. This configuration limits the benefit of the pressure recovery pipe to minimize the power required by the compressor. FIG. 3 therefore shows a modification wherein the pressure recovery pipe 26 has a plurality of openings 50 therein and a full bulkhead 52 located between the pressure recovery pipe and the walls 12 of the duct. Bulkhead 30 is still a perforate plate with the openings spread throughout the plate avoiding a high velocity at any one location. The flow leaving the pressure recovery pipe is at a higher pressure than the high pressure chamber.

We claim:

1. A test cell for thrust testing for a gas turbine engine at simulated altitude conditions, comprising:
   a wall or plurality of walls defining an airflow duct;
   a support for supporting a gas turbine engine within said airflow duct;
   means for guiding substantially all the inlet air into the gas turbine engine;
   a pressure recovery pipe coaxial with and downstream of the gas turbine engine;
   an exhaust compressor located to draw air from said pressure recovery pipe; and
   a perforated bulkhead between said pressure recovery pipe and said walls of said airflow duct, dividing said airflow duct into a low pressure chamber in direct communication with the inlet of said pressure recovery pipe, and a high pressure chamber in fluid communication with the interior of said pressure recovery pipe.

2. A test cell as in claim 1 further comprising:
   the total flow area of the perforations in said perforated bulkhead being between 10% and 50% of the total area of said perforated bulkhead.

3. A test cell as in claim 1 further comprising:
   said pressure recovery pipe having holes in the pipe wall, opening into said high pressure chamber.

4. A test cell as in claim 1 further comprising:
   a compressor suction cavity upstream of said exhaust compressor;
   said pressure recovery pipe arranged to discharge flow into said compressor suction cavity; and
   said high pressure chamber open to and contiguous with said compressor suction cavity.

* * * * *